US007058723B2

(12) United States Patent
Wilson

(10) Patent No.: US 7,058,723 B2
(45) Date of Patent: Jun. 6, 2006

(54) CONGESTION CONTROL FOR INTERNET PROTOCOL STORAGE

(75) Inventor: Andrew W. Wilson, Fremont, CA (US)

(73) Assignee: Adaptec, Inc., Milpitas, CA (US)

( * ) Notice: Subject to any disclaimer, the term of this patent is extended or adjusted under 35 U.S.C. 154(b) by 860 days.

(21) Appl. No.: 09/726,676

(22) Filed: Nov. 29, 2000

(65) Prior Publication Data

US 2001/0032269 A1    Oct. 18, 2001

Related U.S. Application Data

(60) Provisional application No. 60/189,639, filed on Mar. 14, 2000.

(51) Int. Cl.
*G06F 15/16* (2006.01)
*G06F 3/06* (2006.01)
*G06F 11/00* (2006.01)

(52) U.S. Cl. ............ 709/235; 370/229; 370/231; 370/234; 709/232; 709/233; 710/61

(58) Field of Classification Search ............... 709/235, 709/232, 230, 233, 234, 231; 710/61; 370/229, 370/230, 230.1, 231, 234
See application file for complete search history.

(56) References Cited

U.S. PATENT DOCUMENTS 5,675,742 A * 10/1997 Jain et al. ............... 709/226
5,970,048 A * 10/1999 Pajuvirta et al. ........... 370/230

(Continued)

OTHER PUBLICATIONS

R. Fox; "TCP Big Window and Nak Options;" Jun., 1989; Internet RFC/STD/FYI/BCP Archives.

M. Allman et al.; "TCP Congestion Control;" Apr., 1999; The Internet Society, Network Working Group, Category: Standards Track.

(Continued)

*Primary Examiner*—Ario Etienne
*Assistant Examiner*—Uzma Alam
(74) *Attorney, Agent, or Firm*—Martine Penilla & Gencarella, LLP

(57) ABSTRACT

A network system for actively controlling congestion to optimize throughput is provided. The network system includes a sending host which is configured to send packet traffic at a set rate. The network system also includes a sending switch for receiving the packet traffic. The sending switch includes an input buffer for receiving the packet traffic at the set rate where the input buffer is actively monitored to ascertain a capacity level. The sending switch also includes code for setting a probability factor that is correlated to the capacity level where the probability factor increases as the capacity level increases and decreases as the capacity level decreases. The sending switch also has code for randomly generating a value where the value is indicative of whether packets being sent by the sending switch are to be marked with a congestion indicator. The sending switch also includes transmit code that forwards the packet traffic out of the sending switch where the packet traffic includes one of marked packets and unmarked packets. The network system also has a receiving end which is the recipient of the packet traffic and also generates acknowledgment packets back to the sending host where the acknowledgment packets are marked with the congestion indicator when receiving marked packets and are not marked with the congestion indicator when receiving unmarked packets. In another example, the sending host is configured to monitor the acknowledgment packets and to adjust the set rate based on whether the acknowledgment packets are marked with the congestion indicator. In a further example, the set rate is decreased every time one of the marked packets is detected and increased when no marked packets are detected per round trip time (PRTT).

32 Claims, 10 Drawing Sheets

U.S. PATENT DOCUMENTS

| | | | | |
|---|---|---|---|---|
| 6,006,270 A | * | 12/1999 | Kobunaya | 709/233 |
| 6,115,749 A | * | 9/2000 | Golestani et al. | 709/235 |
| 6,141,692 A | * | 10/2000 | Loewenstein et al. | 709/234 |
| 6,170,022 B1 | * | 1/2001 | Linville et al. | 710/229 |
| 6,252,848 B1 | * | 6/2001 | Skirmont | 370/229 |
| 6,487,170 B1 | * | 11/2002 | Chen et al. | 370/231 |
| 6,625,118 B1 | * | 9/2003 | Hadi Salim et al. | 370/229 |
| 6,671,258 B1 | * | 12/2003 | Bonneau | 370/235 |

OTHER PUBLICATIONS

M. Handley et al.; "TCP Congestion Window Validation;" Jun., 2000; The Internet Society, Network Working Group, Category: Experimental.

S. Floyd; "A Report on Some Recent Developments in TCP Congestion Control;" Jun. 5, 2000.

Unknown author, "TCP Timeout and Retransmission," Chapter 21, undated copy of article from Internet.

* cited by examiner

CONGESTION CONTROL FOR INTERNET PROTOCOL STORAGE

This application claims the benifit of 60/189,639, filed Mar. 14, 2000.

BACKGROUND OF THE INVENTION

1. Field of the Invention

This invention relates generally to the field of computing technology and more particularly concerns the reducing of congestion in internet protocol storage.

2. Description of the Related Art

Typically, in the computing industry, data may be transferred over several different types of networks such as the Internet, Large Area Networks (LAN), Wide Area Networks (WAN), Storage Area Networks (SAN), etc. Typically, data transferred over these types of networks may involve utilization of data transfer protocols such as, for example, transmission control protocol (TCP) and an internet protocol (IP). Quite often, the protocols representative of the types of transfer protocols used over the Internet is commonly known as TCP/IP.

Through use of the TCP, data that is sent over a network is broken up into little pieces for transmission and reassembled once the data reaches its destination. Data may be sent in the form such as, for example, data packets, etc. Depending on the interface used, the TCP may break down data into a variety of data packet sizes such as 128 byte packets. The TCP includes its own information which allows the data to be reattached in the correct order as well as resending any data that happens to get "dropped" (data that is lost due to various reasons such as congestion over the network). IP routes the data packaged by the TCP to a destination such as a device within a network.

TCP/IP protocols may also be used to direct data flow and transfer in data storage systems over a network. For example, small computer system interface (SCSI) may be used over TCP/IP to store data over a network onto a SCSI peripheral device for storage. Therefore, TCP and IP are often used over a network to control data transfer to and from a storage device. Typically TCP utilizes a form of congestion avoidance and control in an attempt to minimize congestion in bulk data movement. Unfortunately, TCP's attempt to minimize congestion while maintaining an optimal data transfer rate is not very successful.

Quite often, data movement by TCP results in increased delay of data transfer due to congestion and lower use of wire bandwidth than is capable by the transmission media. In one example, TCP utilizes a combination of a slow start mechanism and a slow start threshold register (SSTHRESH) in an attempt to unsuccessfully optimize data throughput while controlling data transfer congestion.

A slow start mechanism initially sends one Maximum Transport Unit (MTU) of data when a new connection is started or when an old connection is restarted after being idle. As each data packet is acknowledged, the send limit is increased so the sending rate of data increases exponentially, 1, 2, 4, 8, etc. Generally, the maximum size of data which may be transported is the lesser of 64 kilobytes or a user set amount. A congestion window (CWND) is the register that enforces this byte limit. Unfortunately, in this example, after an initial slow step up in transmission rate, the slow start mechanism quickly hits the capacity limit of a network because of the exponential increase in the data transported. For example, if a network can only handle 16 packets at a time, the limit would be reached after only 5 packet round trip times (RTT). A round trip time is the time it takes for a packet to be sent from a sending host until the time the sending host receives an acknowledgement for the packet. SSTHRESH works to superimpose a cap on a slow start mechanism by limiting the increase in the CWND from an exponential rate to one packet per round trip time once the SSTHRESH value is exceeded.

TCP combines slow start and SSTHRESH by reducing CWND to 1 MTU, entering slow start when congestion is detected, and setting the SSTHRESH to 50% of the total number of packets in transport at the time the congestion is detected. Consequently, when congestion is detected, packet injection increases rapidly to 50% of the rate prior to congestion detection. The data transfer rate is reduced by a multiplicative fashion for fairness reasons so sending hosts taking up more of the throughput capacity is penalized more than sending hosts taking up less of the throughput capacity. For further details regarding the fairness concept in TCP data transfer, reference may be made to an article published in 1989 entitled, "Analysis of the Increase and Decrease Algorithms for Congestion Avoidance in Complex Networks" written by Dah-Ming Chiu and Raj Jain. This article is hereby incorporated by reference. Because slow start is utilized and CWND is reset to 1 MTU, the data transfer rate drops severely after congestion is detected even if congestion is not severe. Accordingly, this method does not allow the use of the full capacity of a transmission media or network while at the same time keeping congestion at a minimum.

In another example, TCP uses packet marking (described below) to determine congestion over a network and attempts to respond accordingly. Problems may arise when multiple hosts attempt to send data over one switch or router. In this circumstance, the switch or line between two switches may become overloaded and congestion may occur resulting in dropped packets.

One common way of detecting congestion over a network is by the use of a random early detection (RED) algorithm which finds potential congestion in the network and attempts to signal the congestion back to sending hosts. The algorithm signals congestion to the sending hosts before the input buffers of a switch are actually filled to slow down data transmission and leaves enough room in the buffers to accommodate a burst of packets without loss. Once congestion is detected by the sending host, it generally reduces its send window (the amount of packets sent during a certain period of time) by a half. Typically, the method used to signal congestion under this method is to "drop" data packets. This means that certain random data packets received by a switch are not sent. When data packets are dropped, the host sender does not receive ACKs (positive acknowledgement packets) indicating that the data packets were received. The dropping of packets forces a host sender to resend the packets that were dropped. The RED algorithm also calculates a running average of queue depth and signals congestion with increasing frequency as the average queue depth increases above a threshold. Therefore, possible congestion is detected before congestion can actually occur. As is obvious, this is a rather severe form of congestion reduction because data packets may be dropped even though congestion has not yet occurred.

Another slightly more gentle way to detect and reduce congestion is by combining the use of a RED algorithm and a data marking system. FIG. 1A illustrates a simplified multiple TCP host data transfer system 100 using the RED algorithm and the data marking system. In this example, a sending host-1 102 and a sending host-2 104 are both connected to a switch-1 106. The switch-1 106 is also connected to a switch-2 108 by a line 107. The switch-2 108 is then connected to a receiving host-1 110 and a receiving host-2 112.

In one example of a data transfer, the sending host-1 102 and the sending host-2 104 may both send data to either the receiving host-1 110 or the receiving host-2 112. In this circumstance, data from both sending hosts 102 and 104 will be sent to the switch-1 106. When the data from the sending hosts 102 and 104 are received, the switch-1 attempts to send data packets from both the sending hosts 102 and 104 to switch-2. Far too often, the connection, such as line 107, between the switches 106 and 108 may not support a transmission rate of data which would enable transportation of data from both the sending hosts 102 and 104. Therefore, congestion may occur (as indicated by a RED algorithm described above) at the switch-1 106 and a buffer of the switch-1 106 may overflow if congestion continues. When congestion occurs, the switch-1 106 marks the packet of data that induced the congestion. The switch-2 108 receives the marked data and sends it on to the receiving host-1 110. When the switch-2 108 receives the marked data, it sends a marked ACK back to the sending host-1 102. When this happens the sending host-1 reads the marked ACK and determines that congestion occurred.

When the sending host-1 102 determines that congestion has occurred, the number of packets sent during a round trip time is calculated. In this example, the round trip time (RTT) is the amount of time it takes for the marked ACK to be received by the sending host-1 102 after the data packet was initially sent. Oftentimes, in present TCP congestion reducing protocols, the sending host-1 102 decreases the packets per round trip time by half so that it will be assured that congestion does not take place and fairness factors are taken into account. Unfortunately, this method cuts the packets per RTT in half even when a marked ACK indicating one marked data packet is received (indicating light congestion), and consequently does not differentiate between heavy and light congestion. Therefore, the true congestion level of the network is not gauged. As a result, inefficiencies may be created in the data transmission system because the packets per RTT is cut in half in cases of severe congestion and also in cases of light congestion. Consequently, a severe data transmission reduction occurs when only a minimal correction is required.

FIG. 1B shows a graph illustrating a prior art method of packet marking congestion reduction. The graph depicts the relationships between packets sent per round trip time versus time. In this graph, the packets per round trip time is increased as long as there is no data congestion. In one example, data congestion occurs at peak 114 which is 16 packets per RTT. In this example, the packets per RTT of 16 is the maximum data transmission available. At that point, the sending host-1 102 decreases the packets per RTT by half to 8 as indicated by valley 116. As data transmission occurs and there is no congestion, the packets per RTT increases until peak 118 when congestion is detected by the sending host-1 102 where the packets per RTT is 12. When congestion is detected, the sending host-1 102 again decreases the packets per RTT by half to 6 as indicated by valley 120. When congestion is not detected, the packets per RTT is increased to 12 as shown by peak 122 where once again congestion is detected and the send window of packets per RTT is decreased by a half. As can be seen, with the severe peaks and valleys of data transmission rate, the effective transmission rate is not very high compared to the maximum transmission rate of 16 packets per RTT. In effect, the space above the curve depicted in FIG. 1B shows the unused transmission capacity by the present TCP. This "sawtooth" type curve shows the inefficiencies of the present forms of data congestion control. The present methods of congestion control therefore do a poor job of taking full advantage of the transmission capability of the transmission media used. Regrettably, the peak and average data transfer rate in these prior art systems are substantially less than the capabilities allowed within a network or most any data transfer system.

In view of the foregoing, what is needed is a new and improved methodology for reducing congestion during data transfer and IP storage. Such an approach would take advantage of the full data transfer capabilities in the transmission media, and take into account the actual amount of congestion in the network in the congestion reduction protocol.

SUMMARY OF THE INVENTION

Broadly speaking, the present invention fills these needs by providing computer implemented methods for reducing of congestion in internet protocol storage.

In one embodiment, a method for optimizing data transmission in a data transfer system is provided. In this embodiment, a level of data transfer congestion within the data transfer system is monitored where the monitoring includes marking data during data transfer congestion and detecting marked data. The method then adjusts a data transfer rate corresponding to the level of data transfer congestion. The adjusting includes reducing the data transfer rate in direct correlation to the level of data transfer congestion as indicated by each marked data and increasing the data transfer rate in direct correlation to a lack of data transfer congestion as indicated by unmarked data per round trip time (PRTT).

In another embodiment, a network system for actively controlling congestion to optimize throughput is provided. The network system includes a sending host being configured to send packet traffic at a set rate. The network system also includes a sending switch for receiving the packet traffic. The sending switch includes an input buffer for receiving the packet traffic at the set rate where the input buffer is actively monitored to ascertain a capacity level. The sending switch also includes code for setting a probability factor that is correlated to the capacity level where the probability factor increases as the capacity level increases and the probability factor decreases as the capacity level decreases. The sending switch also has code for randomly generating a value where the value is indicative of whether packets being sent by the sending switch are to be marked with a congestion indicator. The sending switch also includes transmit code that forwards the packet traffic out of the sending switch where the packet traffic includes one of marked packets and unmarked packets. The network system also has a receiving end which is the recipient of the packet traffic and also generates acknowledgment packets back to the sending host where the acknowledgment packets are marked with the congestion indicator when receiving marked packets and are not marked with the congestion indicator when receiving unmarked packets.

In yet another embodiment, a method for actively controlling congestion to optimize throughput is provided. First, the method transfers a data packet to an input buffer of a sending switch at a set rate. Then the method monitors the input buffer to ascertain a capacity level of the input buffer. A probability factor that is correlated to the capacity level of the input buffer is set where the probability factor increases as the capacity level increases and the probability factor decreases as the capacity level decreases. Then the method randomly generates a value where the value is indicative of whether the data packet sent by the sending switch is to be marked with a congestion indicator. The data packet is then forwarded out of the sending switch to a recipient where the data packet is one of a marked data packet and an unmarked data packet. Then, an acknowledgment packet to be sent from the recipient to the sending host is generated. The acknowledgment packet is marked with the congestion indicator when the marked data packet is received and is not marked with the congestion indicator when the unmarked data packet is received.

The advantages of the present invention are numerous. The present invention utilizes an intelligent and powerful congestion reduction protocol to enable significant increases in data transfer efficiencies. Specifically, the present invention takes into account the actual amount of congestion within a transmission media to determine the optimal data transmission rate. By doing this, the present invention has the potent ability to both reduce congestion in a transmission media and also to take full advantage of the transmission overhead available in a transmission media. Therefore, the present invention may be used to optimize any data transmission protocol to increase and enhance data transmission efficacy.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE EXEMPLARY EMBODIMENTS

Figure 1A:
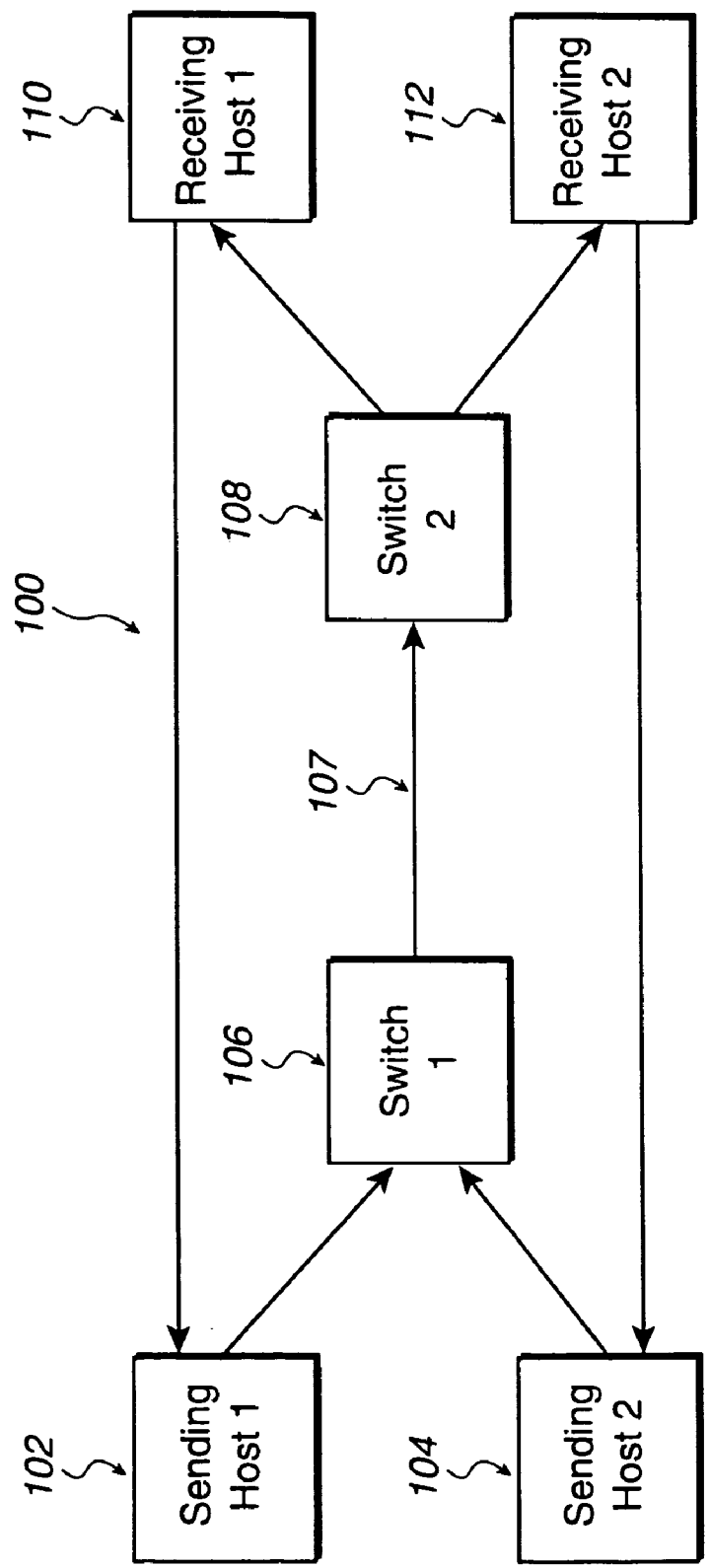
FIG. 1A illustrates a simplified multiple TCP host data transfer system combining the RED algorithm and the data marking system.
Figure 1B:
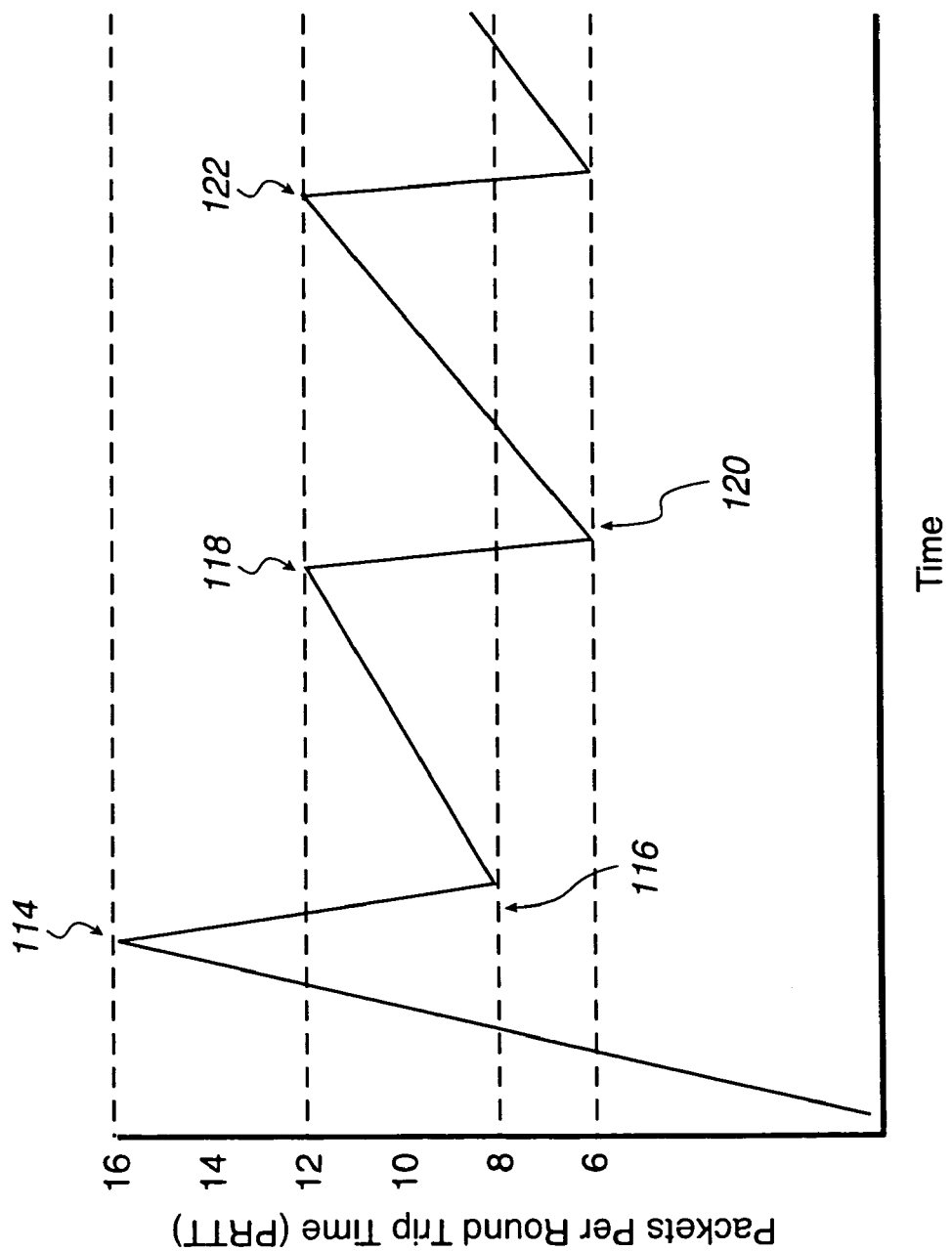
FIG. 1B shows a graph illustrating a method of packet marking congestion reduction.

An invention is described for computer implemented methods for reducing congestion in data transfer systems and internet protocol storage. In addition, the described methods may be used to reduce congestion in any form of data transfer protocol. It will be obvious, however, to one skilled in the art, that the present invention may be practiced without some or all of these specific details. In other instances, well known process operations have not been described in detail in order not to unnecessarily obscure the present invention.

In order to solve the problems of the prior art, the present invention utilizes an intelligent and efficient data transfer protocol to reduce the unnecessary overcompensation of data transfer rates during data transfer congestion and thereby optimize data throughput. It should be appreciated that the present invention may be utilized in any data transfer protocol where data congestion needs to be minimized while optimizing data transmission, such as, for example, Transmission Control Protocol (TCP), Simple Transport Protocol (STP), etc. In one embodiment, the method is utilized in conjunction with a TCP/IP system where two or more host data sources transfer data to a switch which must control the data throughput to a receiving switch. In this system, data congestion can be reduced while data throughput is kept at a high level. In this type of scenario, the present invention intelligently determines the data transfer congestion by monitoring the capacity of an input buffer of a sending switch and optimally adjusts the data throughput by utilizing data and acknowledgment marking so excess throughput capabilities are not wasted by overcautious data transfer schemes. It should be appreciated that while TCP functionality is described in terms of data packets, data packets (or packets) as utilized herein, may be any type, grouping, or size of data such as, for example, bytes of data, segments of data, data without header information, data with header information, etc. It should also be understood that TCP typically utilizes bytes of data and hence data packets (or packets) as used herein would be an appropriate number of bytes such as the number of bytes in a packet or a maximum transmission unit. Therefore, data transfer of any type or form may benefit from the methods of the present invention. In an exemplary embodiment, the present invention employs a packet by packet data transfer reduction (which correlates directly with the data congestion level of the system) when data transfer congestion is detected instead of prior art transfer rate reductions of, for example, a fixed 50% reduction. Consequently, during times of high data transfer congestion, the data transfer rate is decreased more than during times of lesser data transfer congestion. As a result, the present invention does not overcompensate for data transfer congestion but adjusts the throughput rate to optimize data throughput without sacrificing data transfer congestion reduction. It should be noted that although the present invention is described in terms of TCP functionality, any other types of data transfer functionality may be utilized with the present invention.

Figure 2:
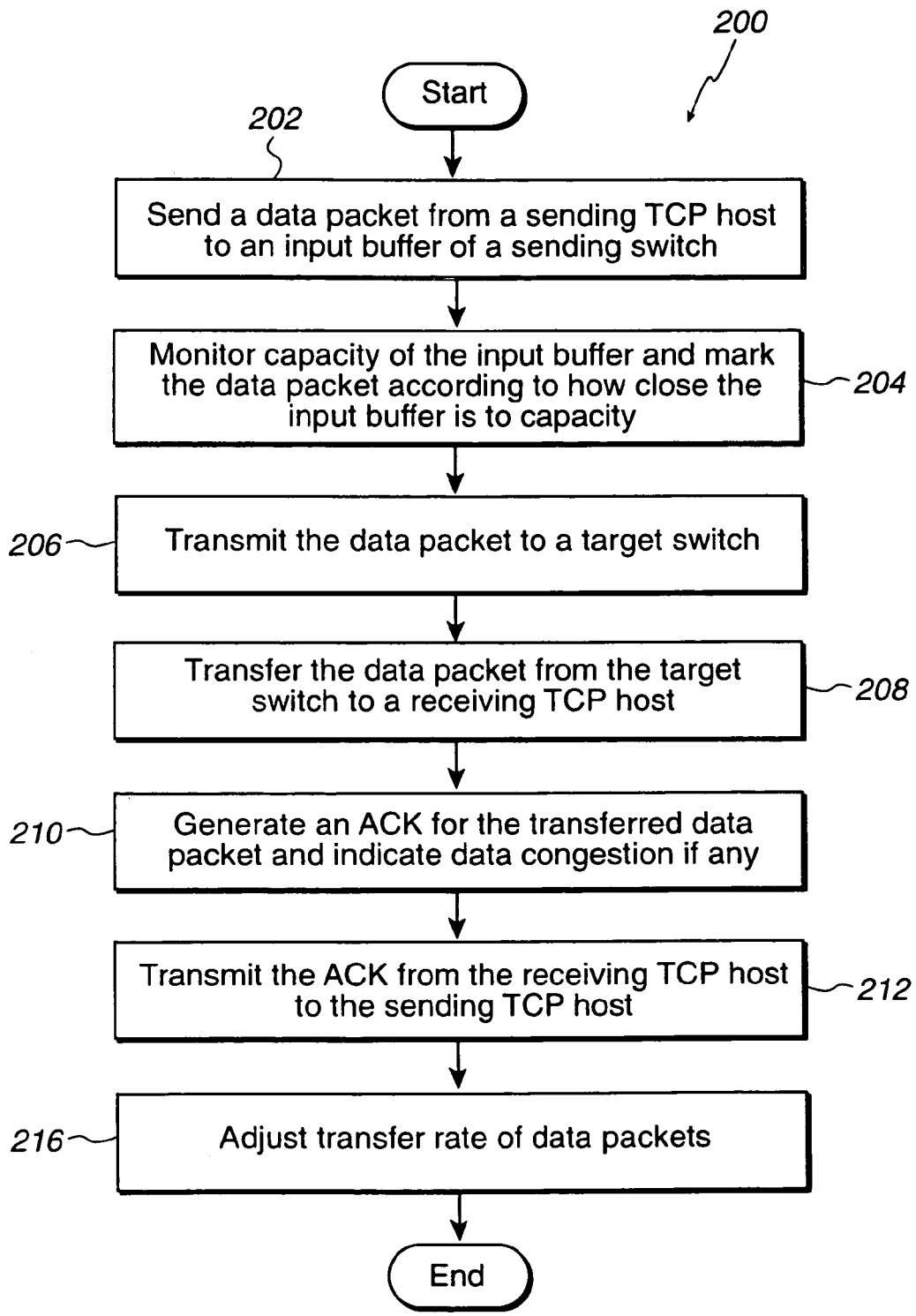
FIG. 2 shows a flowchart defining a process where congestion in internet protocol storage is reduced and data throughput is optimized in accordance with one embodiment of the present invention.

FIG. 2 shows a flowchart 200 defining a process where congestion in internet protocol storage is reduced and data throughput is optimized in accordance with one embodiment of the present invention. It should be understood that the processes depicted in the flowchart 200 may be in a program instruction form written on any type of computer readable media. For instance, the program instructions can be in the form of software code developed using any suitable type of programming language. The data transfer congestion reduction protocol may also be embodied in hardware form. For completeness, the process flow of FIG. 2 will illustrate an exemplary process whereby congestion in a data transfer system is reduced while optimizing data throughput.

It should be appreciated that the present invention may be utilized in any type of data transfer system which has for example, a sender of data and a recipient of data, etc. It should be understood that the sender of data may be any type of device which may send data such as, for example, a sending host, a sending switch, multiple sending switches, multiple sending hosts, etc. It should also be appreciated that the recipient of data may be any device which may receive data such as, for example, a receiving switch connected to a receiving host, the receiving host without the receiving switch, multiple receiving switches, multiple receiving hosts, etc. Therefore, one exemplary data transfer system may include a sending host connected to a sending switch which is connected to a receiving switch which is then connected to a receiving host. The receiving host may also be able to send information back to the sending host to acknowledge receipt of data.

The method starts with operation 202 which sends a data packet from a sending TCP (Transfer Control Protocol) host to an input buffer of a sending switch. In operation 202, the data packet is sent from the sending TCP host and received by the input buffer of the sending switch which controls transmission of the data packet to a target switch (also known as a receiving switch). In one embodiment, the sending TCP host sends data to the input buffer in a set rate of a certain packets per round trip time (PRTT). A round trip time is the amount of time required for the data packet to be sent to a target host in addition to the time required for the sending host to receive the acknowledgement information for the data packet. It should be understood that the present invention may be utilized in any data input and transmission structure such as, for example, in a data transfer system employing one or more sending and receiving hosts, one or more switches, etc. In one embodiment, the sending switch may receive data packets from two or more sending TCP hosts, and therefore manage data inflow from multiple TCP hosts to a destination switch which is in turn connected to multiple receiving hosts. In operation 202, as data packets from the sending TCP hosts arrive at the sending switch, the data packets are kept in the input buffer within the sending switch. It should be appreciated that the switch may also be a router, a routing mechanism, or any other type of device which may direct data to a destination.

After operation 202, the method progresses to operation 204 where a capacity of the input buffer is monitored and the data packet is marked according to how close the input buffer is to capacity. Because a send window (the amount of packets sent during a certain period of time) of the one or more sending TCP host to the sending switch may become greater than the data transfer rate from the sending switch to the target switch, the input buffer may start to become full. Data transmission decrease may occur for a variety of reasons such as for example, congestion within a data transfer system, a network, etc. If the input buffer becomes full, the input buffer may start to overflow and data packets may be dropped. Dropped data is data that must be resent by the sending TCP host because the data is not transferred to the target switch. The present invention prevents such data congestion while at the same time optimizing data throughput in a transmission media. It should be understood that as used herein, transmission or transfer media may be any type of conduit(s) through which data transfer may occur such as, for example, a wire, network connections, connections between TCP hosts, connections between switches and TCP hosts, connections between switches, etc.

When the buffer level nears capacity, the probability of the data packet being marked becomes greater, and the data packet sent to the target switch may be marked by the sending switch to indicate possible congestion. In one embodiment, whether a particular data packet is marked depends on the capacity level of the input buffer (percentage of the input buffer filled). In an exemplary embodiment, if the input buffer is 80% full, there is an 80% probability that the next data packet sent to the target switch will be marked. It should be understood that any type of mathematical correlation to the capacity of the input buffer may be utilized to determine the probability that the data packet will be marked such as, for example, having a probability that is double the percentage capacity of the input buffer (e.g., percentage capacity of 30% with the probability of 60%), etc. The percentage probability that the next data packet sent to the target switch will be marked may also be known as a probability factor. It should also be understood that the data packet may be marked anywhere within the data packet which could indicate data congestion of the sending switch. In one embodiment, the data packets are marked in the IP header to indicate data transfer congestion in the sending switch. Operation 204 is discussed in further detail in reference to FIG. 3.

Then the method moves to operation 206 where the data packet is transmitted to the target switch. In operation 206, the sending switch transfers the data packet to the target switch over a transmission media over, for example, a network, etc. It should be appreciated that the data packet may be sent from or to any data managing device such as a switch, a router, and the like. Therefore, the method described herein may be used in any variety of data transfer systems, devices, and protocols.

After operation 206, the method progresses to operation 208 where the data packet from the target switch is transferred to a receiving TCP host. In one embodiment, a transmit code such as, for example, a transmit circuitry of a network node, may be utilized to forward packet traffic (a plurality of the data packets) out of the sending switch. By use of information contained within the IP header of the data packet, the data packet is sent to an appropriate receiving host. The receiving TCP host analyzes the data packet to determine if the packet is marked with congestion data.

Then the method moves to operation 210 where an ACK with information regarding the data packet is generated. The ACK (positive acknowledgement) is typically data that is sent from the receiving TCP host to the sending TCP host to notify the sending TCP host that certain data packets have been received. Generally, an ACK is sent for every data packet or every series of data packets to indicate that data was successfully received by the receiving host. If the sending host does not receive an ACK for a particular data packet in a set period of time, a "time out" occurs and the data packet not ACKed is resent. It should be appreciated that the ACK may be marked in any way which would show specific information regarding marked data packets. In one embodiment, if the data packet is marked, the receiving TCP host generates an ACK marked with the data congestion information within the ACK header. In another embodiment, a congestion control bit may be set in the ACK header to show that a particular data packet was marked. If the data packet is not marked, an unmarked ACK is generated. It should be appreciated that although the functionality of the congestion marking method is shown by marking and sending back an ACK for the received data packet, any other type of data congestion notification may be used such as, for example, utilizing a NAK (negative acknowledgement) in an STP to notify a host that certain data packets have not been received. When TCP is utilized, only ACKs are used while in STP both ACKs and NAKs may be employed to show dropped packets and data congestion.

In one embodiment, when STP is utilized, a NAK may be used in conjunction with the ACK where the NAK may be sent if a data packet was dropped for reasons which may or may not be related to data congestion in the transmission media. Typically, NAK's are used to notify the sender that a particular packet of data needs to be resent. In an exemplary embodiment, if data packets 34, 35, and 37 are received by the target host employing STP, the target host knows that data packet 36 is missing and sends a NAK to the sending host indicating that all data packets up to data packet 35 have been received. In that way, a sending host utilizing STP knows that it must resend packet 36. The NAK may also be marked and sent from a receiving host (or any other type of transport protocol host) to the sending host when a marked data packet is received to indicate data transfer congestion. Operation 210 is discussed in further detail in reference to FIG. 5.

After operation 210, the method advances to operation 212 where the ACKs from the receiving TCP host are transmitted to the sending TCP host. In this way, the sending TCP host can receive information regarding the success of the data transmission with respect to certain data packets. In one embodiment, by receiving ACKs from the receiving TCP host, the sending TCP host may determine which data packets reached the receiving TCP host, and also if data congestion exists at the sending switch as seen in operation 216. In another embodiment, if STP is utilized, both ACKs and NAKs may be transmitted to the sending host to indicate marked data packets.

After operation 212, the method advances to operation 216 where a transfer rate of data packets is adjusted. In one embodiment, the sending TCP host time stamps each data packet in computer memory and compares the time stamp of the sent data packet to the time when the acknowledgment is received for the data packet. During the round trip time (RTT), the sending host sends the number of packets allowable by the congestion window (CWND). The CWND is a congestion window that limits the amount of data that can be transmitted into a transmission media before receiving an ACK. Therefore, the sending TCP host keeps track of the sent data packets and waits for a round trip time to be completed for each of the data packets. The sending TCP host waits to receive the ACK for the data packet and decreases the data transmission rate when the data packet is marked (meaning congestion exists). If, during a full RTT, none of the data packets are marked (no congestion exists), the rate of data transfer is increased.

In one embodiment, when an ACK for a data packet is received and if the data packet is shown to have been marked, the data transfer rate is decreased by one packet per round trip time. If none of the data packets were marked during a RTT, the data transfer rate is increased by one packet per round trip time. In one embodiment, the data transfer rate is increased immediately after marked data is detected, and the data transfer rate is increased after a full RTT has elapsed and no data was detected as being marked. Therefore, the increasing of the data transfer rate is typically gradual while the decreasing of the data transfer rate may be rapid. After an acknowledgement is received and the data transfer rate is adjusted, the timer of the sending TCP host is reset and the TCP host waits to determine if the next data packet was marked or not. When the ACK for the next data packet is received, the transfer rate may be adjusted again. Therefore, the method can keep adjusting the data transfer rate to utilize the full capacity of a transmission media. It should be noted that the combination of additive increasing of the data transfer rate and multiplicative decreasing the data transfer rate satisfies fairness requirements when multiple sending hosts are sending various amounts of data. In another embodiment, if STP is utilized instead of TCP, the number of marked data packets are shown by the number of marked ACK's or NAK's that are sent back to the sending host. The congestion data is transferred to the sending host through the ACKs and/or NAKs because the sending host can control the size of the send window and determine how much data is sent to the sending switch. Operation 216 is explained in further detail in reference to FIG. 4.

By use of the congestion control protocol, data packet transfer may be intelligently and optimally managed so data packet dropping is reduced while at the same time increasing the maximum data throughput in any data transfer system such as for example, a network, a storage system, etc. Therefore, in one embodiment, by detecting the marked data packet, congestion at intervening switches between hosts and the receiving host's input buffer may be detected and reduced. As a result, data packet dropping may be significantly decreased.

Figure 3:
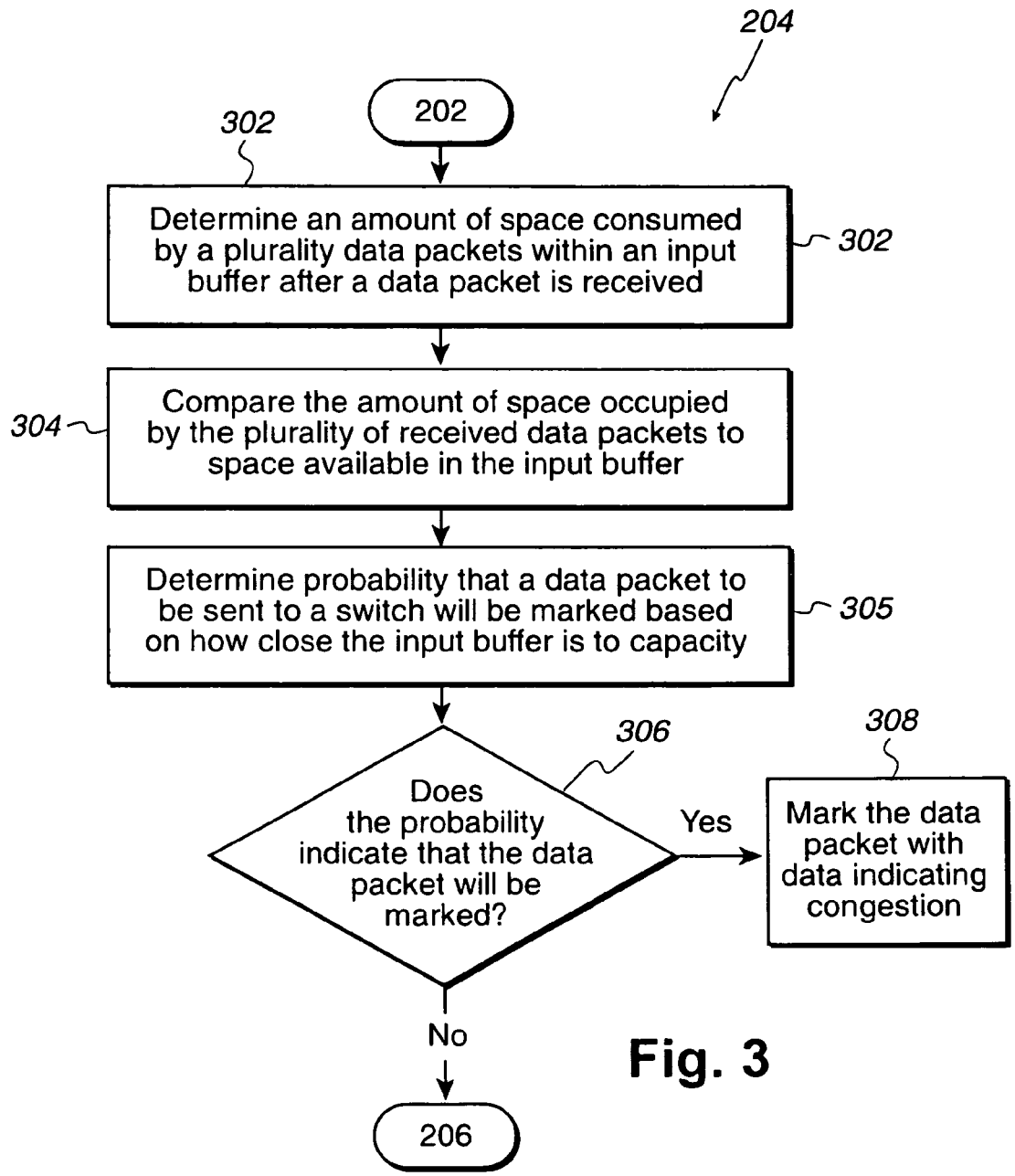
FIG. 3 shows a flowchart which illustrates the monitoring of the capacity of the input buffer within a sending switch and marking data packets according to how close the input buffer is to capacity in accordance with one embodiment of the present invention.

FIG. 3 shows a flowchart 204 which illustrates the monitoring of the capacity of the input buffer within a sending switch and marking data packets according to how close the input buffer is to capacity in accordance with one embodiment of the present invention.

The flowchart 204 begins with operation 302 where the method determines an amount of space occupied by a plurality of data packets within an input buffer after a data packet is received. In one embodiment, the input buffer of a sending switch is actively monitored meaning that the input buffer is examined to determine the amount of space occupied by the data packets. As indicated above in reference to FIG. 2, the input buffer may receive data packets at a much higher rate than the sending switch can send the data packets to a target switch. This may happen for a variety of reasons such as transmission congestion between the switches, multiple TCP hosts transmitting too many data packets, or a single TCP host sending data packets at an accelerated pace (e.g., a large send window). Therefore, to prevent congestion, the amount of data within an input buffer is monitored.

After operation 302, the method progresses to operation 304 where the amount of space occupied by the plurality of data packets is compared to space available in the input buffer of the sending switch. In this operation, the method examines how much space the plurality of data packets occupies with the addition of the new data packet and determines how full the input buffer is relative to its total capacity. In one embodiment, the amount of space within the input buffer that is occupied by data may be described as a percentage of the input buffer that is filled (i.e., capacity level).

Then the method advances to operation 305 where a probability that a data packet to be sent to a switch will be marked is determined. It should be appreciated that any structure within a data transfer system may be configured to mark data packets. In one embodiment, the input buffer receives the data packet from the sending TCP host and the sending switch may mark the data packet depending on a probability equal to the percentage of the input buffer that is filled. It should be appreciated that any type of method to indicate input buffer capacity status may be utilized in the data congestion reduction of the present invention such as, for example, using a probability method, etc. As indicated above in reference to FIG. 2, the x% probability of being marked may also be known as a probability factor. It should be appreciated that the probability factor may be any multiple or mathematical function of a percentage of input buffer capacity as long as the probability correlates with the input buffer capacity. In one embodiment, when the input buffer is x% full, a next data packet to be sent will have an x% probability of being marked. In another embodiment, when the input buffer is x% full, the next data packet to be sent will have x% multiplied by 2 (with a maximum of 100%) probability of being marked. In one embodiment, code in the sending switch may set the probability factor. In this embodiment, the code utilizes a probability operation to determine whether a data packet should be marked. It should be understood that the processes and code described and depicted in the operations of FIG. 3 may be in a program instruction form written on any type of computer readable media. For instance, the program instructions can be in the form of software code developed using any suitable type of programming language. The operations of FIG. 3 may also be embodied in hardware form.

In an exemplary embodiment, if 70% of the input buffer is full at a particular time, the data packet sent by the sending switch has a 70% probability of being marked. Consequently, when more of the input buffer is filled, there is a correspondingly higher probability that the data packet sent will be marked. By this method, the data transfer rate may be controlled by the level of congestion of the data transfer system as monitored at the input buffer. Therefore, the rate of marked data packets transmitted is directly correlated to the relative amount of space within the input buffer that is occupied by data packets.

After operation 305, the method proceeds to operation 306 where the method determines if the probability indicates that the data packet will be marked. In this operation, the method utilizes the probability obtained in operation 305 (from the capacity of the input buffer) to ascertain whether or not the data packet is to be marked. In essence, data packets are randomly marked depending on the percentage capacity of the input buffer that is filled.

It should be understood that any way of utilizing probabilities may be used to determine if a certain packet with a particular probability will be marked. In one embodiment, if there is a 70% probability that the data packet will be marked (meaning the input buffer is 70% full), a random number generator may be utilized to establish whether the 70% probability to mark the data packet has been met. In such an embodiment, code within the switch may be utilized to create a random number (a value generated by, for example, a random number generator) within a range of 1–100. In this exemplary embodiment, if the random number generated is within a range of 1–70 (because there is a 70% chance that a random number between 1 and 100 will be between 1 and 70), the sending switch will mark the data packet. On the other hand, if the random number generated is within the range of 71–100, the data packet is not marked by the sending switch. In another exemplary embodiment, if the data packet has a 20% probability of being marked (meaning the input buffer is 20% filled), the code within the sending switch will determine that a random number generated within the range of 1–20 (20% probability) results in the sending switch marking the data packet. If the random number generated is within the range of 21–80, the sending switch does not mark the data packet. If operation 306 determines that the data packet is to be marked, the method moves to operation 308 where a data packet is marked with data indicating congestion. It should be appreciated that the data packet may be marked in any way to show data transfer congestion. In one embodiment, if the data packet is to be marked, operation 308 sets data in the IP header of the data packet (congestion indicator) showing that data congestion exists (e.g., that data is backing up in the input buffer because of data congestion). Therefore, later in the process, this marking enables a sending TCP host to determine data transfer congestion and therefore decrease the send window appropriately if congestion exists.

If operation 306 indicates that the data packet will be unmarked, the flowchart 204 ends and the method progresses to operation 206 of FIG. 2. Consequently, through this marking system, a feedback loop is created so the sending TCP host may determine the level of data congestion within the data transmission system and react accordingly. In this way, congestion control is managed in a powerful manner using an intelligent feedback system.

Figure 4:
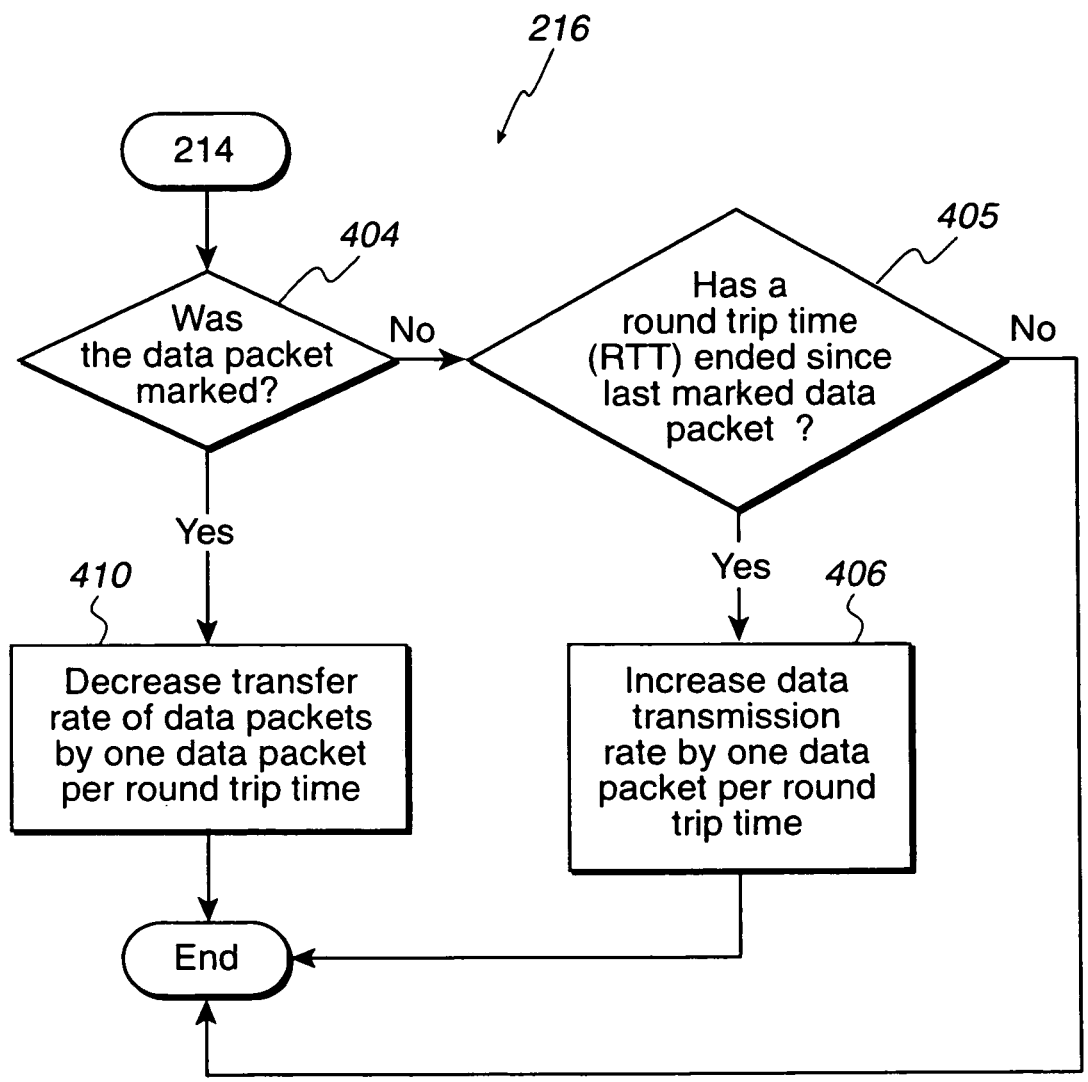
FIG. 4 shows a flowchart defining the method for adjusting a transfer rate of data packets in accordance with one embodiment of the present invention.

FIG. 4 shows a flowchart 216 defining the method for adjusting a transfer rate of data packets in accordance with one embodiment of the present invention. It should be understood that any type of protocol may be used with the present invention to powerfully adjust the data transfer rate such as, for example, STP which utilizes both ACKs and NAKs to determine the transfer rate.

Flowchart 216 begins with operation 404 where it is determined if the data packet sent by the sending host was marked. In one embodiment, ACKs are generated by the receiving TCP host and sent to the sending TCP host to be analyzed. The ACK (specifically the ACK header) is examined for a marked congestion bit showing that a specific data packet was marked. The ACK may contain data regarding the transmission of one data packet or multiple data packets. In this way, a round trip time (RTT) for the transmission of a specific data packet may be determined by examining the ACK containing data regarding the specific data packet.

In essence, the method determines if any data transfer congestion took place, because if an ACK for a particular data packet is not marked then that is indicative that the data packet was not marked with congestion data. In another embodiment, NAKs may be utilized in addition to ACKs (in STP) to determine data congestion where the method can determine if any marked NAKs have been received.

If the data packet is not marked, the flowchart progresses to operation 405 which determines whether a round trip time (RTT) has ended since a last marked data packet was detected. As indicated above in reference to FIG. 2, when a particular data packet is sent out, the sending host determines the time until an ACK for the particular data packet is received. In one embodiment, the timer is reset every time marked data is received. During the RTT, data packets are sent up to the CWND limit which limits the amount of data that may be sent in a transmission media before an ACK is received. In one embodiment, if a full RTT passes since the last marked data packet was detected, the sending host determines that there is no congestion and greater throughput is possible.

After operation 405, the method progresses to operation 406 where data transmission rate is increased by one data packet per round trip time. It should be appreciated that the data transmission rate may be in increased in any way which would correlate to the level of data congestion in the transmission media as long as fairness principles (with regard to multiple hosts sending different amounts of data) are followed and data throughput is optimized. In one embodiment, the sending host increases data transmission (or transfer) rate by one data packet per round trip time. By increasing the data packet transmission by one data packet per round trip time, the method can optimize the data transfer rate gradually to the highest possible level without increasing congestion or data packet dropping. In another embodiment, NAKs may be utilized in addition to ACKs (in STP), and the method increases the data transmission rate by one packet if no marked data packets are indicated in a round trip time by an ACK or NAK. After operation 406, the flowchart 216 ends.

If the ACKs are marked, the method actuates operation 410 where the transfer rate of data packets is decreased by one data packet per round trip time. As indicated previously, it should be understood that any other way of notifying the host TCP's of the marked data packet may be utilized such as, for example, using NAK's to notify congestion, etc. It should also be appreciated that the acknowledgement data may be in any form or contain any type of data as long as information regarding which data packets were marked may be indicated, such as, for example, including information for multiple data packets within one ACK. From the continual monitoring of each marked data packet, the sending host may determine exactly the level of congestion within a network, a storage system, or a transmission line.

In one embodiment, operation 410 decreases the data transfer rate (or send window) by one packet for each data packet shown to be marked by an ACK (or by the NAKs). It should be appreciated that any way of decreasing the data transfer rate may be employed as long as fairness principles are followed and data throughput is optimized. In this exemplary embodiment, the send window may be decreased by use of the equation $SW_{t+1} = (1-MR)*SW_t$ where $SW_t$ is a send window at RTT interval "t", and MR is a mark rate (fraction of packets marked while passing through a network). By use of this equation, the level of send window reduction directly correlates with the amount of data packet marking which shows data transfer congestion. Therefore, when congestion is detected, the send window shown in the equation by $SW_t$ is decreased by the product of $SW_t$ multiplied by the mark rate (MR). Accordingly, this means that the send window after congestion is detected ($SW_{t+1}$) is the original send window ($SW_t$) decreased by exactly the amount of marked packets ($SW_t*MR$). This equation shows that fairness rules are being followed where data transfer is decreased at a multiplicative rate while data transfer increase is at an additive rate. Therefore, the method reduces data transmission in direct response to the actual amount of data congestion existing within a network or other data transfer device or system. It should be appreciated that other ways of determining send window reduction during congestion may be implemented so long as the data throughput capacity of the transmission media is optimized. As can be seen, by use of the congestion reduction protocol, the send window may be optimized to take advantage of the throughput capabilities of the transmission media without compromising data packet dropping reduction.

Figure 5:
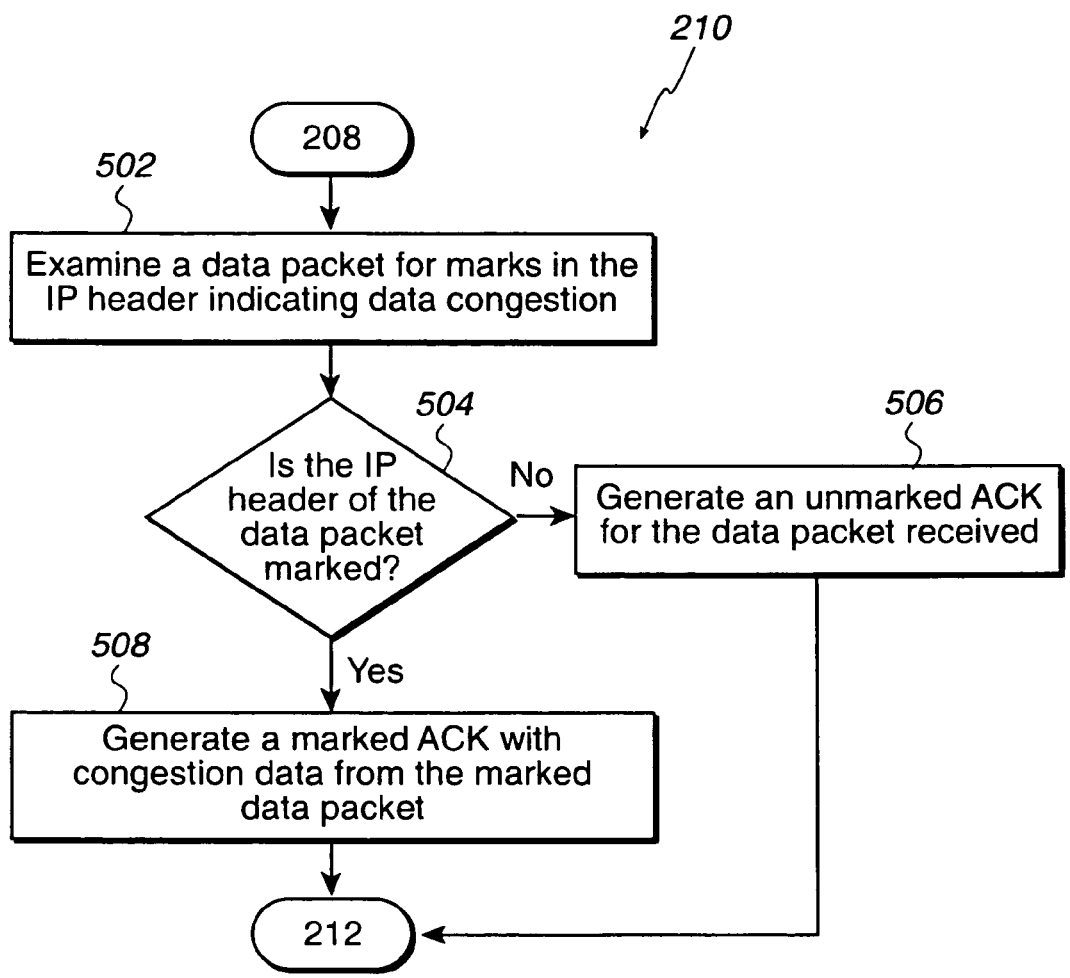
FIG. 5 shows a flowchart defining the generating of an ACK for the transferred data packet in accordance with one embodiment of the present invention.

FIG. 5 shows a flowchart 210 defining the generating of an ACK for the transferred data packet in accordance with one embodiment of the present invention. Flowchart 210 begins with operation 502 which examines a data packet for marks in the IP header indicating data congestion in a sending switch. In one embodiment, the IP header of the data packet is examined to determine if data transmission congestion exists. It should be understood that data congestion information may be located in any part of the data packet, including, for example, in any non-header portion of the data packet.

After operation 502, the method advances to operation 504 which determines if the data packet is marked. In one embodiment, the receiving TCP host analyzes the data packet to determine whether to generate a marked ACK or an unmarked ACK. It should be understood that other methods besides the use of ACKs may be utilized to determine data congestion. In another embodiment, the receiving TCP host may analyze the data packets received (to find out if any data packets were dropped) to determine whether to generate a NAK or not. Therefore, the method described is flexible so any type of data transfer protocol may be utilized in conjunction with the present method to optimize data throughput.

If the data packet is not marked, the method moves to operation 506 where an unmarked ACK is generated for the data packet received. In one embodiment, when the data packet is received by the receiving TCP host, an acknowledgement data is sent back to the sending switch. When there is no data congestion, the data packet is not marked so a generated ACK is not marked with congestion data. If the data packet is not marked, the flowchart 210 terminates at operation 506.

If the data packet is marked, the flowchart concludes with operation 508 where a marked ACK with congestion data from the marked data packet is generated. In operation 508, the marked ACK signifies that a corresponding data packet was marked with congestion data in the IP header. In one embodiment, the ACK is marked in an ACK header indicating data packet marking which in turn indicates anticipated or actual data transfer congestion. In another embodiment, a congestion bit may be set which shows marking of a particular data packet. It should be appreciated that the ACK may be marked in any way which would indicate data packet marking. In another embodiment, NAKs may be utilized in addition to ACKs to show data packet dropping or data transfer congestion. As can be seen, a sending TCP host may, through the use of data packet and ACK marking, determine the level of congestion of the data network, thus enabling optimization of data transfer throughput in a data transfer environment.

Figure 6:
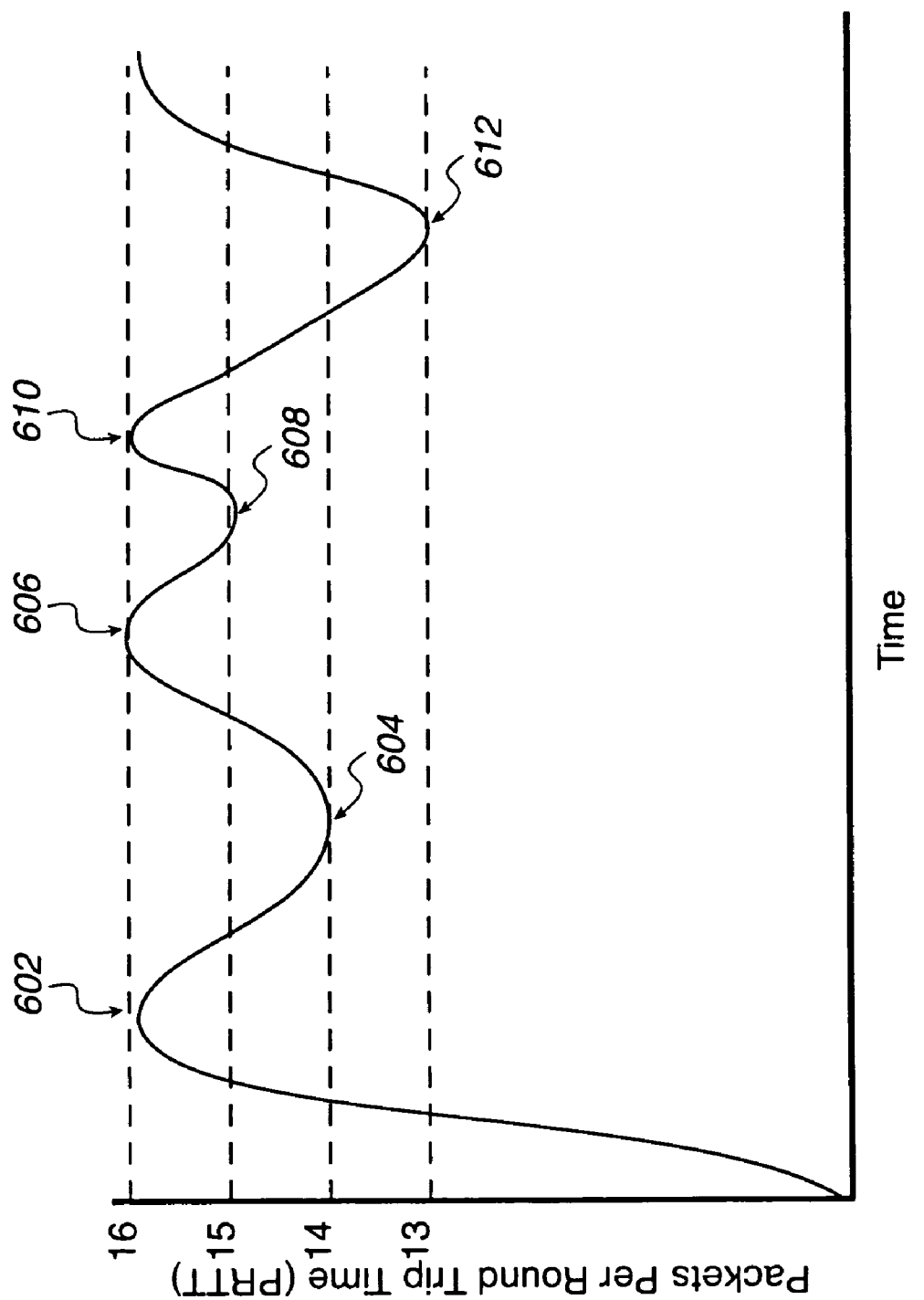
FIG. 6 illustrates a graph showing a packet transfer optimizing scheme in accordance with one embodiment of the present invention.

FIG. 6 illustrates a graph showing a packet transfer optimizing scheme in accordance with one embodiment of the present invention. As data packets are sent from multiple sending TCP hosts to a sending switch, the number of packets sent are increased as long as no ACK's are marked per round trip time (PRTT) as discussed above in reference to FIGS. 2 and 4. In one embodiment, if a data packet is not marked during a round trip time then the rate of data packet transfer rate is increased by one data packet PRTT. Therefore, as shown in FIG. 6, the packets PRTT increases for every round trip time where no data packets are marked until peak 602 is reached. At peak 602, in one embodiment, data congestion takes place and the input buffer starts nearing capacity (high capacity level) with the acceptance of a data packet. At that point, the data packet is marked by a sending switch because of the high probability (i.e., probability factor) that the data packet will be marked. It should be understood that the data transfer system that experiences congestion may include one or more sending hosts, one or more switches, and one or more receiving hosts. Congestion may occur in the switch when too many senders send data to a receiving host. Congestion may also occur at the receiving host if it is not able to keep up with full wire speed delivery. In one embodiment, as discussed in reference to FIG. 2 above, when the congestion marking protocol is utilized in both the sending and receiving hosts, a target switch receives the data packet from the sending switch and transfers the data packet to the receiving TCP host. When the receiving TCP host analyzes the data packet and determines that the IP header of the data packet is marked indicating congestion, the receiving TCP host generates an ACK with a marked ACK header indicating congestion in a network or transmission line. The marked ACK is then sent back to the sending TCP host. After an ACK indicates that a marked data packet was received by the sending TCP host, the sending TCP host decreases the send window (rate of packets sent to a destination switch) by one data packet for the data packet indicated as being marked. In one embodiment, this happens every time a data packet is shown as being marked. This decrease in data transfer rate is shown by the downward slope of the graph after peak 602. This type of cycle repeats again at peak 606 and 610.

Once data congestion takes place at peak 602, the method lowers the data packet transfer rate when indication of each of the marked data packets is received (as indicated by marked ACKs). This is shown in FIG. 6 by valley 604. At valley 604, the sending switch is no longer receiving marked ACKs so it starts to increase the data packet transfer rate by one data packet per round trip time as it receives acknowledgement during a RTT which is shown by the slope upward from valley 604 to peak 606. Valleys 608 and 612 illustrate a similar mechanism of data transfer increases after the data packet transfer rate is lowered in response to data congestion in the system. As can be seen, by the illustration of FIG. 6, the data congestion reduction system of the present invention works intelligently and proactively to not only reduce data congestion but more importantly enable the data transfer system to find an optimal data transfer rate without wild fluctuations. Importantly, the present invention enables the use of data transfer decrease that is in direct correlation to the level of congestion within a data transfer system. Therefore, the total data throughput is optimized and the capabilities of the data transfer system are fully utilized.

Figure 7:
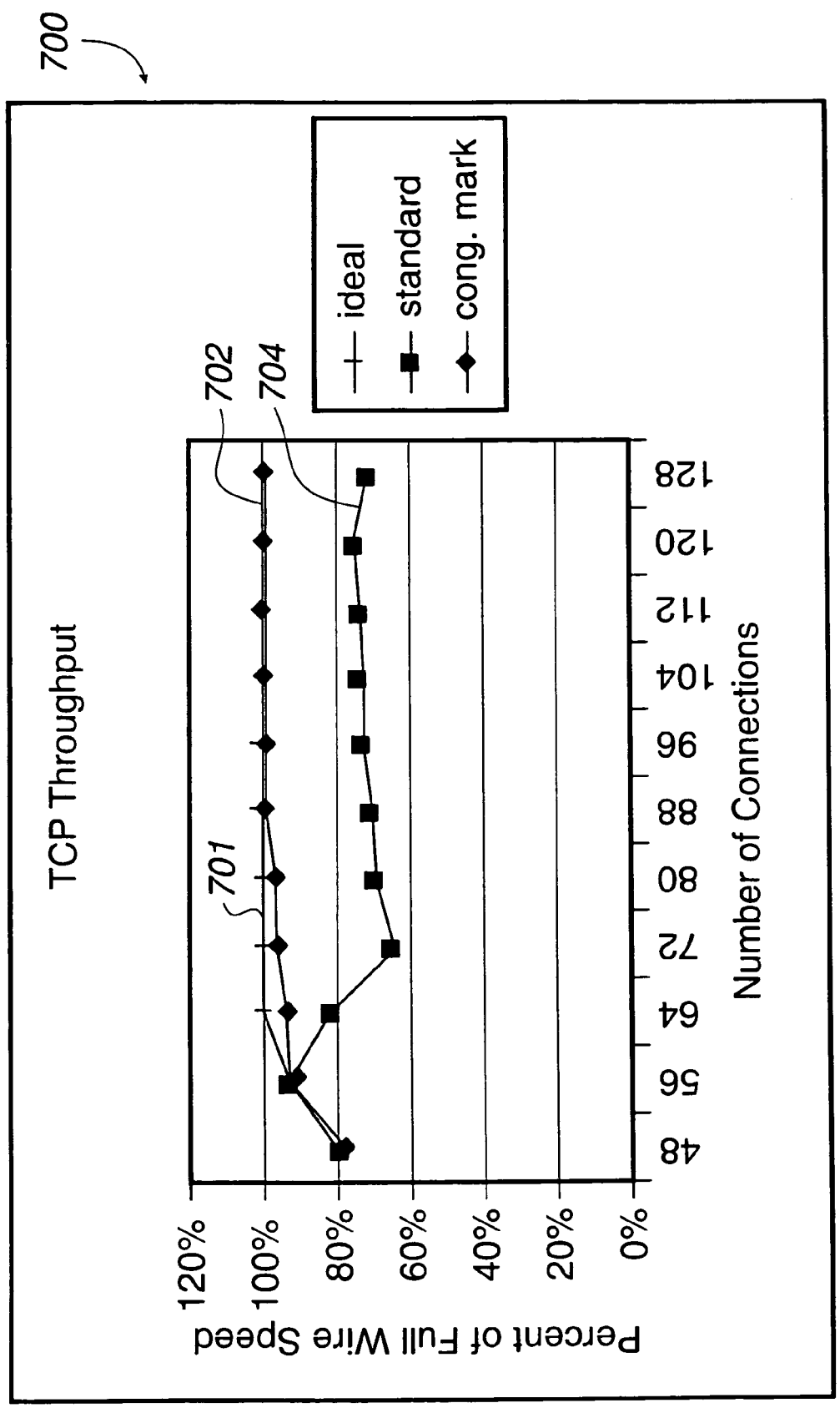
FIG. 7 shows a graph of transport protocol performance of two different types of protocols in wire utilization for varying traffic loads in accordance with one embodiment of the present invention.
Figure 8:
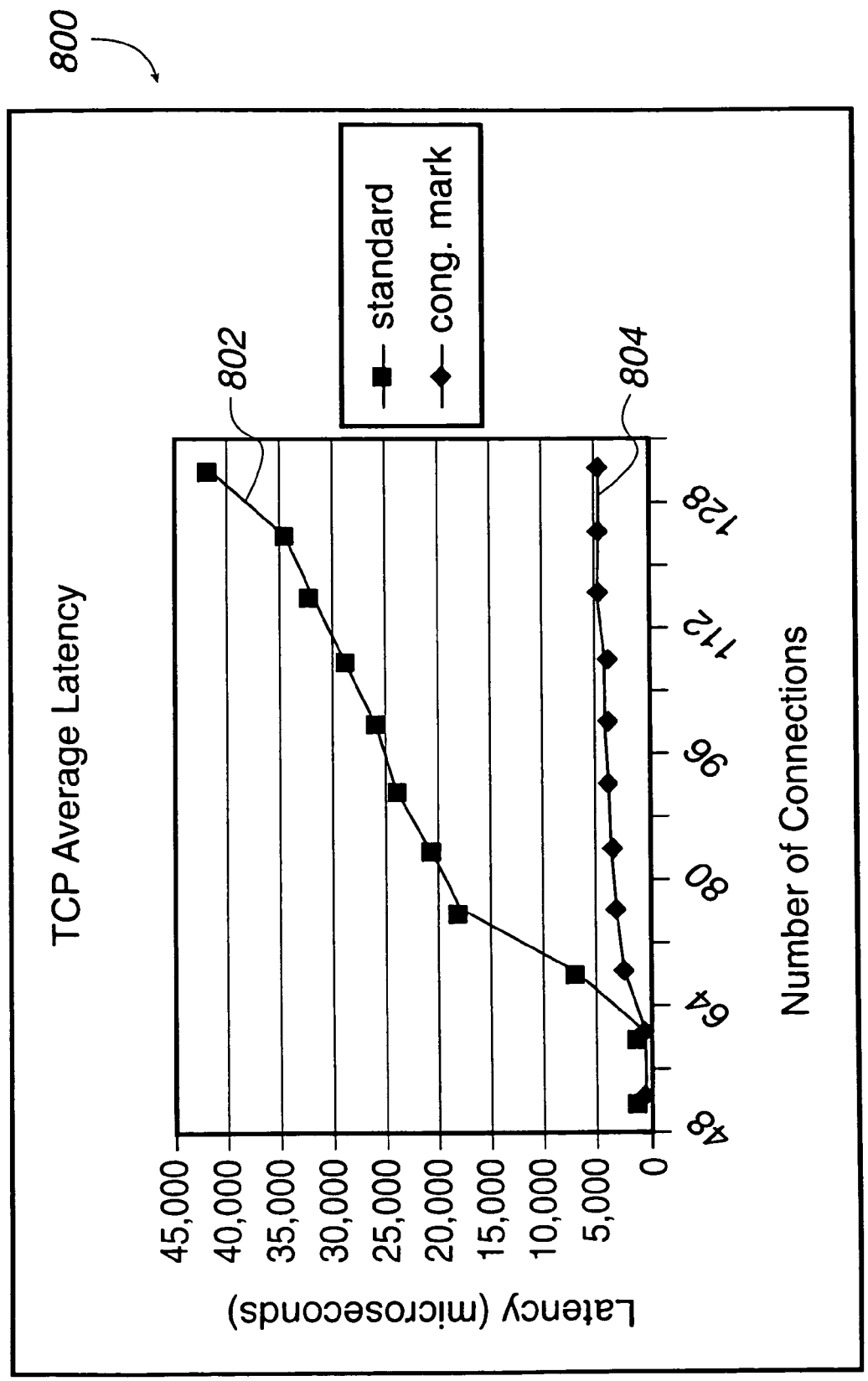
FIG. 8 shows a graph illustrating an average latency comparison of two different transport protocols in accordance with one embodiment of the present invention.
Figure 9:
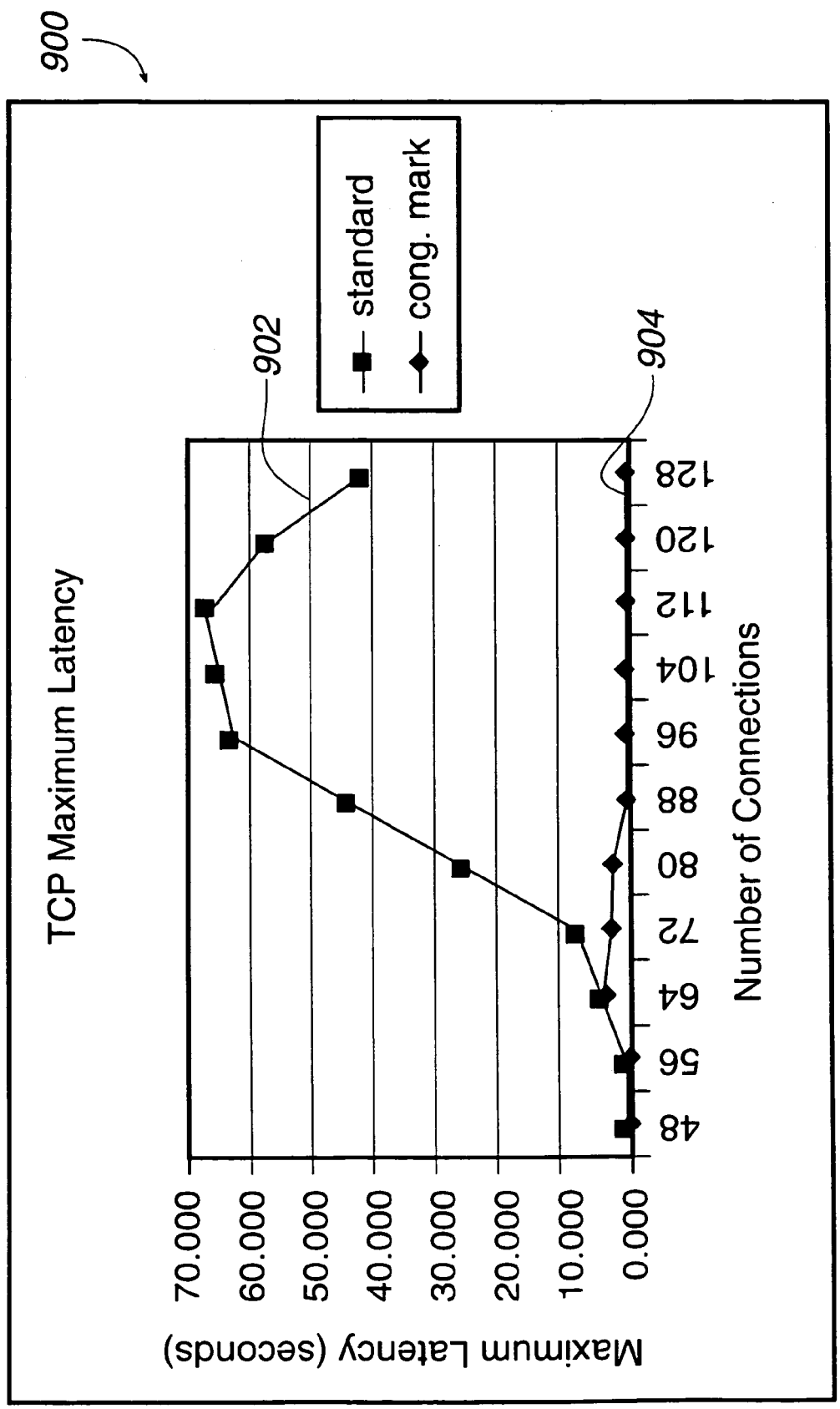
FIG. 9 shows a graph depicting maximum network latency experienced with TCP during the simulations in accordance with one embodiment of the present invention.

FIGS. 7, 8, and 9 illustrate embodiments of the present invention in the form of simulations quantifying the performance benefits of TCP with congestion marking of the present invention versus simple TCP. FIGS. 7, 8, and 9 show various comparisons between standard TCP with fast retransmit (plain TCP) and an enhanced TCP with the more intelligent data transfer congestion reduction protocol of the present invention (CMARK TCP). The fast retransmit algorithm uses the arrival of 3 duplicate ACKs as an indication that data has been lost. Therefore, when 3 duplicate ACKs are received, TCP resends the data it believes has been lost without waiting for the retransmission timer to time out.

The TCP protocols are simulated with and without the congestion marking scheme in accordance with one embodiment of the present invention. It should be appreciated that the congestion reduction scheme of the present invention may be utilized to optimize any transport protocol. The simulations illustrate the dramatic benefits from the enabling utilization of the present invention to optimize the full wire bandwidth available. It should be appreciated that the simulations are presented for illustrative purposes only and not intended to limit the congestion reduction scheme to the specific applications shown below.

The system used in the simulations consists of six to sixteen "Just a Bunch of Drives" (JDOB) bridges, each connected through Gigabit Ethernet to a switch, which is then connected to a single Host. The switch may have input queues which can hold 170 full size packets (i.e. 256 KB), and the host may have 170 NIC buffers. A random, 4 KB read workload is simulated with eight sessions per bridge, each carrying the traffic expected of about 4 high performance drives (in effect simulating 32 drives per bridge box).

FIGS. 7, 8, and 9 show simulations involving two variations of TCP, one with standard prior art TCP (plain TCP or standard TCP) and the other with TCP using the congestion reduction methods of the present invention (CMARK TCP). Both the plain TCP and CMARK TCP use the standard congestion windowing algorithm, but based on packets rather than bytes. That is, average and standard deviation of Round Trip Time (RTT) was measured using the Internet Engineering Task Force (IETF) recommended algorithm, as implemented in a Free Berkeley Software Distribution (BSD) operating system. In the simulations, a timeout (when an acknowledgment for a data packet is not received by a certain period of time) set the SSTHRESH variable to half of the outstanding packets, and the congestion window (CWIND) to 1 packet. SSTHRESH is a slow start threshold which determines whether the sending state is slow start or congestion avoidance. A CWND is a congestion window that limits the amount of data that can be transmitted into a transmission media before receiving an ACK. The congestion window may also determine a set rate of data packet sending (in packets per round trip time (PRTT)) of a sending host. The congestion window was then incremented according to the slow start and congestion control procedures defined by the IETF in Request for Comments (RFC) 2581. The RFC 2581 is hereby incorporated by reference. The base TCP also includes fast retransmit, which set the SSTHRESH and CWIND to half the outstanding packets when a fast retransmit was indicated. This means that the send window is reduced by half during congestive periods. The second version, TCP with Congestion Marking in accordance with one embodiment of the present invention, reduced CWIND by 1 packet with each marked packet. In one embodiment, three data transfer windows are operating at once: a configuration maximum which can be up to 64 kilobytes; a send window which operates with TCP and higher level flow control; and CWND, the congestion window. TCP stops sending data if any of the three windows are exceeded.

In one embodiment of the present invention, the fraction of marked packets in a given RTT is proportional to the amount of congestion. Therefore, since the protocol reduces the size of CWND for each marked packet and not for just one packet for each RTT in which marked packets were received, the effect is multiplicative rather than additive. This concept is embodied in the equation, $SW_{t+1} = (1-MR) * SW_t$, discussed in detail in reference to FIG. 4. The number of outstanding packets in an RTT window is generally CWND, so if x% of data packets return marked, then the new value of CWND after the RTT is equal to x/100 multiplied by the value of CWND at the beginning of the RTT. In one exemplary embodiment, if 50% of the data packets return marked, then x=0.5 so the CWND would be reduced to half.

In one embodiment, packets are marked by the switch and a Network Interface Controller (NIC) based on a very simple algorithm, which determines the fraction of the switch input queue or NIC packet array in use at the time of packet removal, and randomly marked packets with a probability identical to that fraction. It should be appreciated that other types of algorithms may be utilized such as, for example, random early detection (RED) and weighted random early detection (WRED) algorithms in high end Internet Routers, etc.

It should be understood that the simulations are only exemplary and other parameter settings which may affect the performance of all two protocols may be utilized after fine tuning with further simulations.

FIG. 7 shows a graph 700 of transport protocol performance of two different types of protocols in wire utilization for varying traffic loads in accordance with one embodiment of the present invention. The graph 700 shows achieved bandwidths of each protocol as a percentage of maximum potential bandwidth of the wire. The potential bandwidth is calculated as the number of packets sent by the JBOD boxes (not counting any retries) divided by the total number of packets that could be delivered in the time period simulated (100 seconds). With 48 sessions (6 boxes) and 56 sessions (7 boxes), the network is not saturated and the bandwidth is limited by the "seek time" of the drives. From 64 sessions onward the network is being offered more traffic than it can handle, so the various congestion schemes are limiting traffic.

In the graph 700, two lines are depicted showing a percent of wire speed regarding two simulations using two different protocols including plain TCP 702 (or standard TCP) and CMARK TCP 704. A third line, ideal line 701, shows the TCP data throughput in an ideal situation. When the congestion marking scheme is enabled, full utilization of the wire is quickly achieved with CMARK TCP 704 while plain TCP 702 shows its limitations by not being able to fully use the transmission capabilities of the wire. Throughput is significantly increased to about 98% of wire from plain TCP's about 78% utilization. By use of the congestion marking protocol of the present invention, throughput for a certain wire may be optimized to nearly 100% by the CMARK TCP 704 protocol. As a result, the graph shows the high level of effectiveness of the present invention in increasing data throughput.

FIG. 8 shows a graph 800 illustrating an average latency comparison of two different transport protocols in accordance with one embodiment of the present invention. The graph 800 shows the average network latency achieved by the protocols. Latency is the amount of time from the first instance a particular packet is transmitted until the final acknowledgement of its correct reception.

The graph 800 shows two lines depicting two different protocols and their average latency times measured against the number of sessions. The two protocols depicted by the lines in graph 800 represent the latency of a plain TCP 802 and a TCP CMARK 804. The latency of the Congestion Marking protocol, the TCP CMARK 804 was dramatically less than that of the plain TCP 802. This is mostly due to the large number of timeouts that plain TCP experiences (even with fast retransmit enabled) compared to the other protocol which has little or no timeouts. Therefore, TCP CMARK 804 indicates that the switch queues are being kept relatively empty enabling bursts of traffic to be handled without overflow. Therefore, the present invention enables powerful data transfer congestion reduction while effectively optimizing data throughput.

Finally, FIG. 9 shows a graph 900 depicting maximum network latency experienced with TCP during the simulations in accordance with one embodiment of the present invention. The simulations depicted in graph 900 show how long worst case latencies can become with the plain network protocols. The two different protocols are shown as different lines in the graph 900. The protocols simulated are a plain TCP 902 and a TCP CMARK 904. Unfortunately, as indicated by graph 900, the prior art method shown by plain TCP 902 have very long latencies. These extremely long latencies may be due to multiple retries of a given packet. Since there are no dropped packets over most of the range of traffic with the congestion marking protocol TCP CMARK 904, there are no retries and hence the worst case latency is similar to the average latency. Therefore, the simulations show that congestion marking of acknowledgement packets show significant data throughput performance as compared with TCP using the present invention data congestion reduction protocol. Therefore, the simulations show the superiority of the present invention in optimizing data throughput while effectively minimizing data transfer congestion. Consequently, the present invention enables powerful data transfer congestion reduction while generating much greater data throughput in a transmission media than the data congestion reduction methods used in the prior art.

Although the simulations show comparisons utilizing TCP, a Simple Transport Protocol (STP), as described in related U.S. patent applications Ser. No. 09/490,629 may be utilized in conjunction with the present data transfer optimizing method to generate one embodiment of the present invention to enable greatly improved data transfer throughput. The STP may be configured to eliminate the overhead and inefficiencies associated with other transport protocols, such as TCP. STP can enable more efficient transfers of data over a communication link, such as a local area network (LAN). Communication can also occur over a larger network, such as the Internet with the additional implementation of the Internet Protocol (IP). Consequently, STP can either run on its own in a local environment or over IP. In a wide area network, it may also be beneficial to run STP over IP to enable communication over level 3 switches and/or routers. Therefore, the use of the STP system may provide even additional data throughput than through TCP systems in circumstances where the more complicated TCP system is not required. As a result, the congestion reduction protocol of the present invention may be utilized with STP to yield substantial data throughput increases over prior art methods such as standard TCP.

The present invention may be implemented using an appropriate type of software driven computer-implemented operation. As such, various computer-implemented operations involving data stored in computer systems to drive computer peripheral devices (i.e., in the form of software drivers) may be employed. These operations are those requiring physical manipulation of physical quantities. Usually, though not necessarily, these quantities take the form of electrical or magnetic signals capable of being stored, transferred, combined, compared and otherwise manipulated. Further, the manipulations performed are often referred to in terms such as ascertaining, identifying, scanning, or comparing.

Any of the operations described herein that form part of the invention are useful machine operations. Any appropriate device or apparatus may be utilized to perform these operations. The apparatus may be specially constructed for the required purposes, or it may be a general purpose computer selectively activated or configured by a computer program stored in the computer. In particular, various general purpose machines may be used with computer programs written in accordance with the teachings herein, where it may be more convenient to construct a more specialized apparatus to perform the required operations.

Although the foregoing invention has been described in some detail for purposes of clarity of understanding, it will be apparent that certain changes and modifications may be practice within the scope of the appended claims. Accordingly, the present invention is to be considered as illustrative and not restrictive, and the invention is not to be limited to the details given herein, but may be modified within the scope and equivalence of the appended claims.

What is claimed is:

1. A method for optimizing data transmission in a data transfer system comprising:
   monitoring a level of data transfer congestion within the data transfer system, the monitoring including marking data during data transfer congestion and detecting marked data, wherein marking data during data transfer congestion includes,
      sending a data packet to a routing mechanism;
      determining a fraction of an input buffer of the routing mechanism that is filled;
      generating a random number between zero and one;
      marking the data packet if the generated random number is less than or equal to the fraction of the input buffer of the routing mechanism that is filled, the marking indicating data transfer congestion; and
   adjusting a data transfer rate corresponding to the level of data transfer congestion wherein the adjusting includes reducing the data transfer rate in direct correlation to the level of data transfer congestion as indicated by each marked data and increasing the data transfer rate in direct correlation to a lack of data transfer congestion as indicated by unmarked data during a round trip time (RTT).

2. A method for optimizing data transmission in a data transfer system as recited in claim 1, wherein the marked data is a data packet that is marked with data congestion information.

3. A method for optimizing data transmission in a data transfer system as recited in claim 1, wherein the unmarked data is a data packet without data congestion information.

4. A method for optimizing data transmission in a data transfer system as recited in claim 1, further comprising:
   generating acknowledgement data by a recipient of the data packet, the acknowledgment data being marked if the data packet is marked.

5. A method for optimizing data transmission in a data transfer system as recited in claim 4, wherein the detecting marked data includes:
   receiving the acknowledgment data from the recipient of the data packet; and
   analyzing the acknowledgement data to determine if the data packet was marked.

6. A method for optimizing data transmission in a data transfer system as recited in claim 5, wherein the reducing further includes decreasing the data transmission rate by one data packet per round trip time (PRTT) for every marked packet detected.

7. A method for optimizing data transmission in a data transfer system as recited in claim 5, wherein the increasing further includes transmitting one additional data packet per round trip time (PRTT) where only the unmarked data packets are detected during a previous round trip time.

8. A method for optimizing data transmission in a data transfer system as recited in claim 2, wherein the marking the data packet includes setting data congestion information in an internet protocol header of the data packet.

9. A method for optimizing data transmission in a data transfer system as recited in claim 4, wherein the generating acknowledgment data includes setting data congestion information in an acknowledgment header if the data packet is marked.

10. A method for optimizing data transmission in a data transfer system as recited in claim 4, wherein the acknowledgement data is a positive acknowledgement (ACK).

11. A method for optimizing data transmission in a data transfer system as recited in claim 1, wherein the data transfer system includes at least a sending host, a sending switch, and a data recipient.

12. A method for optimizing data transmission in a data transfer system as recited in claim 11, wherein the data recipient includes at least one of a receiving host and a receiving switch connected to the receiving host.

13. A network system for actively controlling congestion to optimize throughput, comprising:
   a sending host being configured to send packet traffic at a set rate;
   a sending switch for receiving the packet traffic, the sending switch including,
      a input buffer for receiving the packet traffic at the set rate, the input buffer being actively monitored to ascertain a capacity level, the capacity level corresponding to a fraction of the input buffer that is filled;
   code for randomly generating a value between zero and one;
   code for marking a packet to be sent by the sending switch with a congestion indicator if the randomly generated value is less than or equal to the capacity level of the input buffer;
   code for leaving a packet to be sent by the sending switch unmarked with respect to the congestion indicator if the randomly generated value is greater than the capacity level of the input buffer;
   transmit code for forwarding the packet traffic out of the sending switch; and
   a receiving end being configured as the recipient of the packet traffic and configured to generate acknowledgment packets back to the sending host, the acknowledgment packets being marked with the congestion indicator when receiving marked packets and not being marked with the congestion indicator when receiving unmarked packets.

14. A network system for actively controlling congestion to optimize throughput as recited in claim 13, wherein the sending host is configured to monitor the acknowledgment packets and to adjust the set rate based on whether the acknowledgment packets are marked with the congestion indicator.

15. A network system for actively controlling congestion to optimize throughput as recited in claim 13, wherein the set rate is a number of packets sent per round trip time (RTT) as determined by a congestion window in the sending host.

16. A network system for actively controlling congestion to optimize throughput as recited in claim 15, wherein the congestion window operates to limit the amount of data that can be transmitted by the sending host before the acknowledgement packet is received.

17. A network system for actively controlling congestion to optimize throughput as recited in claim 13, wherein the sending host decreases the set rate every time one of the marked packets is detected.

18. A network system for actively controlling congestion to optimize throughput as recited in claim 17, wherein the set rate is decreased by one packet per round trip time (PRTT) for each of the marked packets that is detected by the sending host.

19. A network system for actively controlling congestion to optimize throughput as recited in claim 17, wherein the sending host increases the set rate when no marked packets are detected per round trip time (PRTT).

20. A network system for actively controlling congestion to optimize throughput as recited in claim 19, wherein the set rate is increased by one packet per round trip time (PRTT).

21. A network system for actively controlling congestion to optimize throughput as recited in claim 13, wherein the congestion indicator is data in the LP header of the packets showing that data transfer congestion exists.

22. A method for actively controlling congestion to optimize throughput comprising:
   transferring a data packet to an input buffer of a sending switch at a set rate;
   monitoring the input buffer to ascertain a capacity level of the input buffer, the capacity level being equal to a fraction of the input buffer that is filled;
   setting a probability factor that is a multiple of the capacity level of the input buffer, the probability factor increasing as the capacity level increases and decreasing as the capacity level decreases;
   randomly generating a value between zero and one;
   marking the data packet with a congestion indicator if the randomly generated value is less than or equal to the probability factor, otherwise leaving the data packet unmarked;
   forwarding the data packet out of the sending switch to a recipient, the data packet being either a marked data packet or an unmarked data packet; and
   generating an acknowledgment packet to be sent from the recipient to the sending host, the acknowledgment packet being marked with the congestion indicator when receiving the marked data packet and not being marked with the congestion indicator when receiving the unmarked data packet.

23. A method for actively controlling congestion to optimize throughput as recited in claim 22, further comprising:
   monitoring the acknowledgment packets; and
   adjusting the set rate based on whether the acknowledgment packet is marked with the congestion indicator.

24. A method for actively controlling congestion to optimize throughput as recited in claim 23, wherein the set rate is a number of data packets sent per round trip time (PRTT) as determined by a congestion window in the sending host.

25. A method for actively controlling congestion to optimize throughput as recited in claim 24, wherein the congestion window operates to limit the amount of the, data packets that can be transmitted by the sending host before the acknowledgement packet is received.

26. A method for actively controlling congestion to optimize throughput as recited in claim 22, wherein the sending host decreases the set rate every time one of the marked data packets is detected.

27. A method for actively controlling congestion to optimize throughput as recited in claim 26, wherein the set rate is decreased by one data packet per round trip time (PRTT) for each of the marked data packet that is detected by the sending host.

28. A method for actively controlling congestion to optimize throughput as recited in claim 26, wherein the sending host increases the set rate when no marked data packets are detected per round trip time (PRTT).

29. A method for actively controlling congestion to optimize throughput as recited in claim 28, wherein the set rate is increased by one data packet per round trip time (PRTT).

30. A network system for actively controlling congestion to optimize throughput as recited in claim 22, wherein the congestion indicator is data in the IP header of the data packet showing that data congestion exists.

31. A method for actively controlling congestion to optimize throughput comprising:
   transferring a data packet to an input buffer of a sending switch at a set rate;
   monitoring the input buffer to ascertain a capacity level of the input buffer, the capacity level being equal to a fraction of the input buffer that is filled;
   setting a probability factor that is a multiple of the capacity level of the input buffer, the probability factor increasing as the capacity level increases and decreasing as the capacity level decreases;
   randomly generating a value between zero and one;
   marking the data packet with a congestion indicator if the randomly generated value is less than or equal to the probability factor, otherwise leaving the data packet unmarked;
   forwarding the data packet out of the sending switch to a recipient, the data packet being either a marked data packet or an unmarked data packet;
   generating an acknowledgment packet to be sent from the recipient to the sending host, the acknowledgment packet being marked with the congestion indicator when receiving the marked data packet and not being marked with the congestion indicator when receiving the unmarked data packet;
   monitoring the acknowledgment packets; and
   adjusting the set rate based on whether the acknowledgment packet is marked with the congestion indicator.

32. A method for actively controlling congestion to optimize throughput as recited in claim 31, wherein the set rate is a number of packets sent per round trip time (PRTT) as determined by a congestion window in the sending host.

* * * * *